United States Patent [19]

Andrews

[11] 4,431,070

[45] Feb. 14, 1984

[54] HIGH SPEED PRECISION WEIGHING AND FILLING METHOD AND APPARATUS

[75] Inventor: James S. Andrews, Westminster, Colo.

[73] Assignee: Hierath & Andrews Corp., Wheat Ridge, Colo.

[21] Appl. No.: 311,147

[22] Filed: Oct. 13, 1981

[51] Int. Cl.³ ............... G01G 13/22; G01G 13/16; G01G 13/24; B07C 5/16

[52] U.S. Cl. ............................. 177/102; 177/110; 177/115; 177/DIG. 5; 222/55; 209/596

[58] Field of Search ........................... 177/90–102, 177/110, 114, 115, DIG. 5, 145; 222/55; 209/592–596; 364/567, 568

[56] References Cited

U.S. PATENT DOCUMENTS

| 1,364,003 | 12/1920 | Smith . | |
|---|---|---|---|
| 2,609,974 | 9/1952 | Brous | 222/442 |
| 2,625,361 | 1/1953 | Schrock | 249/56 |
| 3,539,028 | 11/1970 | Krolopp | 177/114 X |
| 3,642,080 | 2/1972 | Forman et al. | 177/DIG. 5 |
| 3,921,737 | 11/1975 | Pleus | 177/115 X |
| 3,974,941 | 8/1976 | Mettler | 222/70 |
| 4,130,171 | 12/1978 | Smith et al. | 177/91 X |
| 4,234,102 | 11/1980 | Spurgeon | 222/55 |
| 4,261,485 | 4/1981 | Borg | 222/500 |
| 4,262,824 | 4/1981 | Hrynewycz | 222/450 |

Primary Examiner—George H. Miller, Jr.
Attorney, Agent, or Firm—John E. Reilly

[57] ABSTRACT

Precision weighing and filling of comminuted materials is carried out at high speeds by advancing the material to be weighed into a rotatable pan, applying an unbalanced electromagnetic force to the pan so as to cause it to rotate through a predetermined angle to dump the contents into a tiltable discharge funnel and selectively locking the pan in a predetermined rotational position in preparation for refilling and the next dumping operation, all in rapid succession.

23 Claims, 12 Drawing Figures

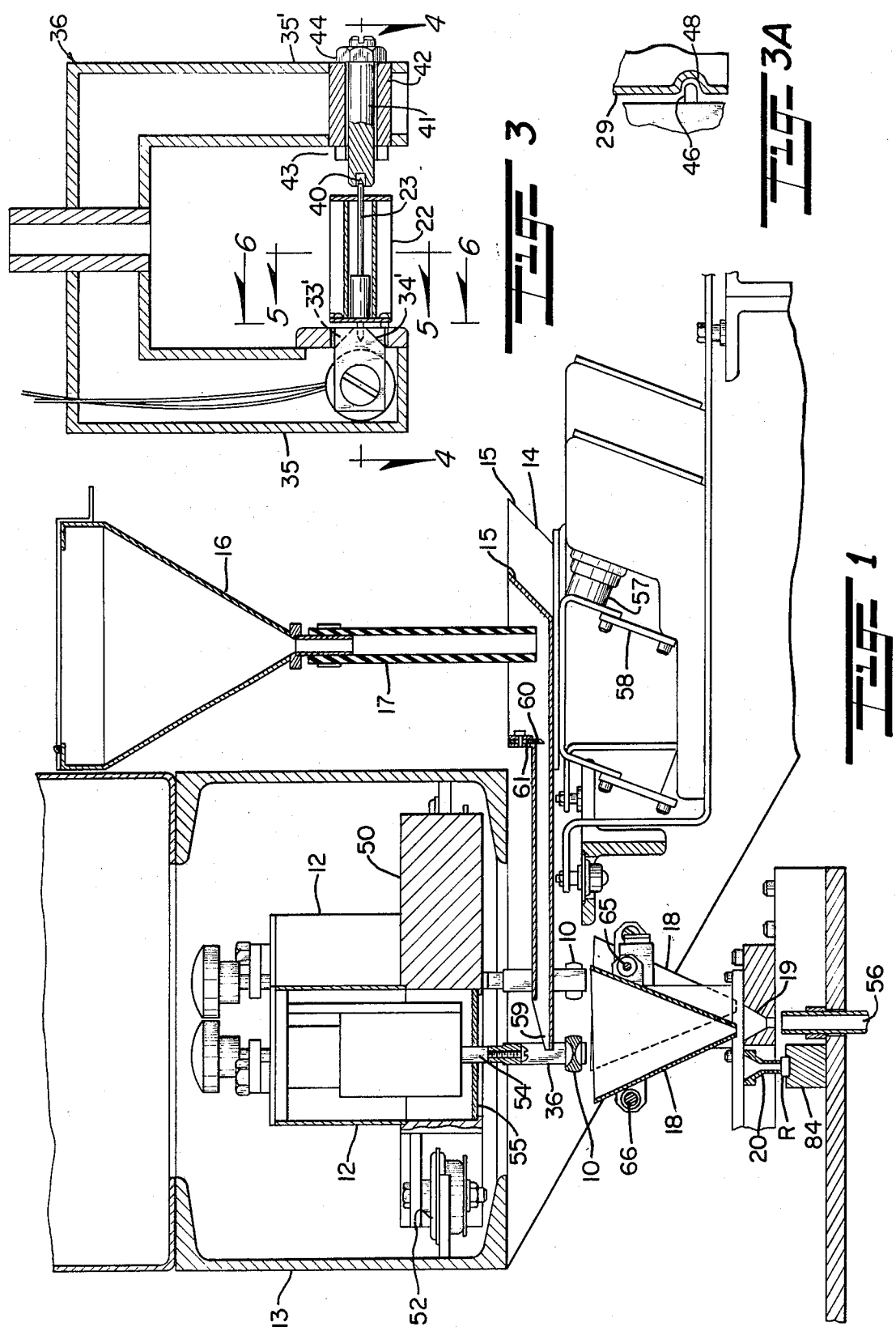

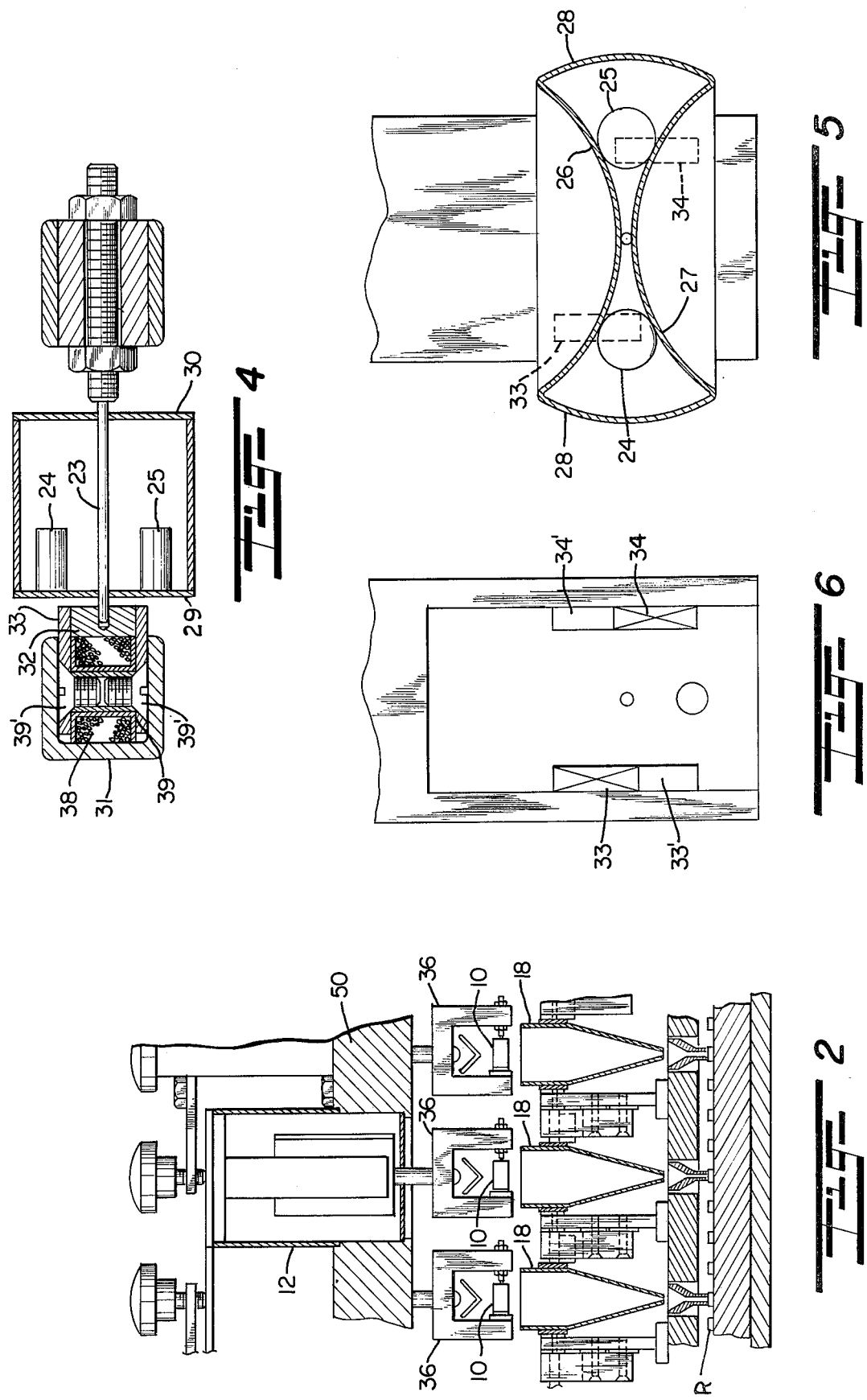

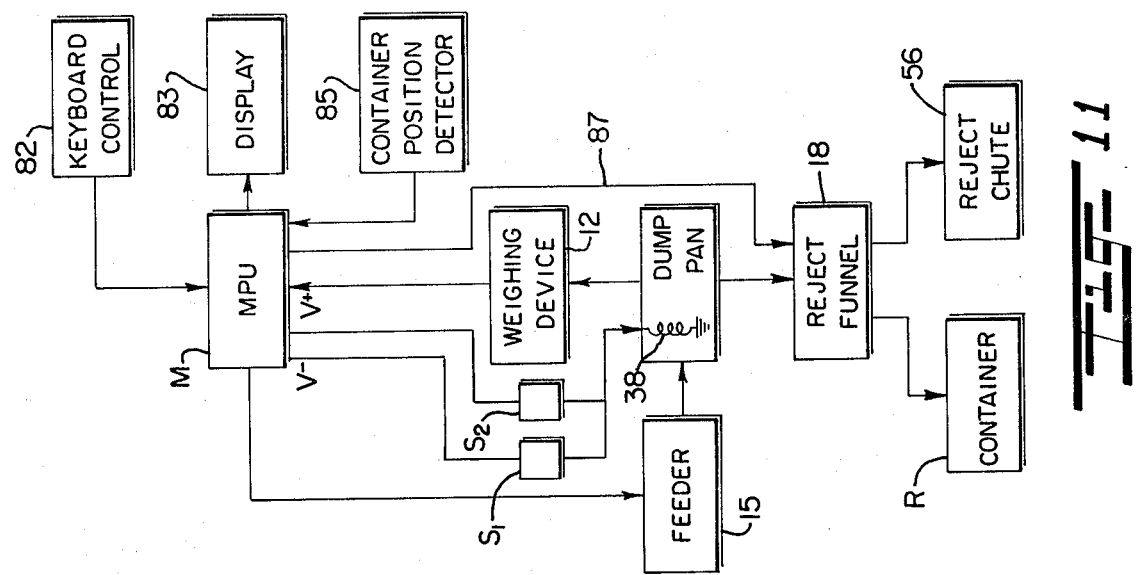
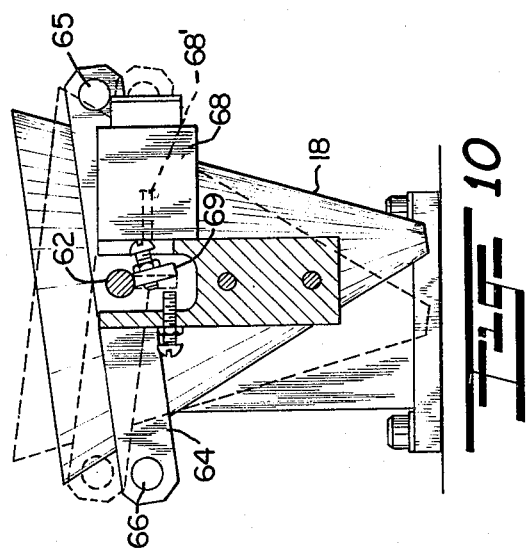
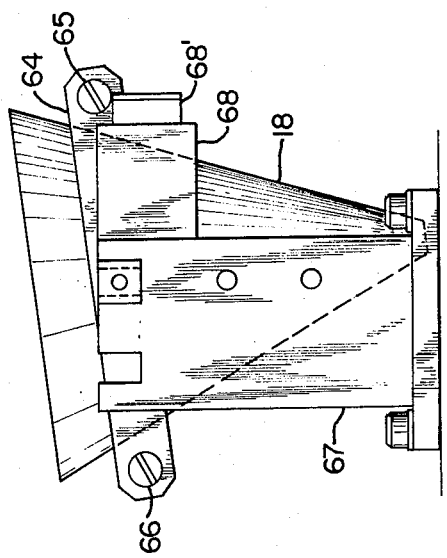
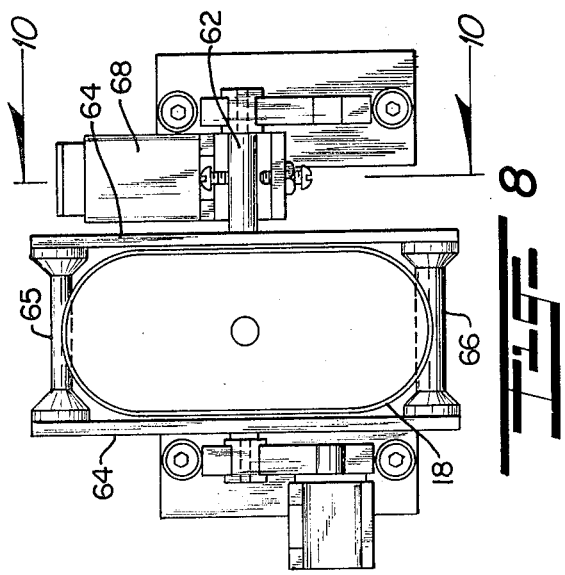
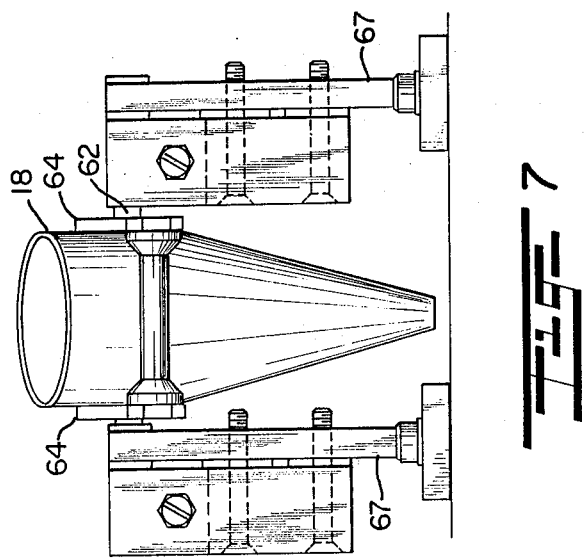

HIGH SPEED PRECISION WEIGHING AND FILLING METHOD AND APPARATUS

This invention relates to weighing devices and more particularly relates to a novel and improved method and means for weighing and dumping selected amounts of a comminuted material.

BACKGROUND AND FIELD OF THE INVENTION

The production in mass quantities of many articles requires the filling of precise measured amounts of chemical materials in powdered or granular form. For instance, in the dispensing of drugs, it is very important to weigh out into each vial or container precise amounts of the material for each tablet or capsule. Indeed, the standard practice in the drug industry is to volumetrically control the amount of material making up each tablet or capsule, since conventional weighing units have been found to be either too slow or inaccurate. It is therefore essential in the production of drugs in mass quantities to provide a high speed system for weighing out each dose and, once weighed, to advance or remove each dose into another receptacle, such as, a vial or container for packaging same. As will become more apparent, the present invention is by no means limited in application to the dispensing of medicines, drugs, or other chemical materials for that matter; however, its novel features and characteristics may be best understood and appreciated from a consideration of its use in that area.

In the past, weighing and filling systems have been devised for dispensing selected amounts of comminuted materials. For example, U.S. Letters Patent to Smith U.S. Pat. No. 1,364,003 discloses a grain receiver used in combination with a hopper which is solenoid-operated to dispense materials. Another patent of interest is to Schrock U.S. Pat. No. 2,625,361 which discloses a weighing and filling device having a material receiver and dumping mechanism which is tilted from side to side to dump the material. U.S. Pat. No. 4,261,485 to Borg is directed to a magnetically operated valve having magnets which slide under the influence of gravity relative to one another so as to repel a permanent magnet-bearing plunger either to an open or closed position. U.S. Pat. No. 2,609,974 to Brous discloses a valve which is selectively opened or closed by a magnetically actuated plunger. Other prior art of general interest in the field of weighing and filling are U.S. Pat. Nos. 3,974,941 and 4,262,824 to Mettler and Hrynewycz.

The prior art as exemplified by the aforementioned patents is considered to fall short in achieving the necessary speed and accuracy in the successive weighing out of selected amounts of material and in such a way as to avoid waste, inaccurate fillings, and greatly reducing the cost of the production of articles requiring such materials where such articles are to be produced in mass production operations. Although conventional apparatus may be adequate to meet establishing weighing tolerances for weighing out relatively large quantities of material, they have not been found to be capable of accurately and rapidly weighing and filling in the lower weight ranges, such as, on the order of 0.10 lbs. to 0.0001 lbs. and where the fill rates must be as high as 10 to 600 fills per minute.

SUMMARY OF INVENTION

It is therefore an object of the present invention to provide for a novel and improved method and apparatus for weighing and dumping comminuted materials; and wherein such method and apparatus are conformable for use in numerous applications which require the dispensing of precise amounts of materials in mass production.

It is another object of the present invention to provide for a novel and improved weighing apparatus in which selected amounts of powdered or granular material may be weighed and dumped in rapid succession while minimizing to the point of eliminating material losses and inaccurate fillings.

It is an additional object of the present invention to provide for a high speed, precision weighing and dumping apparatus which is compact, and has minimal power requirements in carrying out a completely automated sequence of steps in filling, weighing and dumping precisely controlled amounts of a comminuted material.

It is another object of the present invention to provide for precision weighing and filling apparatus which is extremely rapid and accurate both in the automated filling and dumping of selected amounts of a comminuted material while being capable of sensing inaccuracies in filling without interrupting the dispensing operation.

In weighing out precise amounts of comminuted materials, any suitable source of supply of the material may be provided, for instance, to advance the material in a steady or continuous stream through a hopper or trough which will in turn discharge it by gravity into a weigh pan or receptacle. Conventional forms of weigh sensors are available to weigh the material discharged into the weigh pan and to sense a given weight limit. In accordance with the present invention, a novel form of weigh pan is mounted for rotation about a horizontal axis which pan includes a recessed area or receptacle to receive the material discharged from the source of supply, and magnetizable means are associated with the weigh pan. Activating means are associated with the weigh sensor so as to be responsive to the weight of material discharged into the weigh pan whereby to apply an unbalanced tipping force to the weigh pan causing it to rotate through a predetermined angle necessary to dump the contents from the pan, and means are provided for retaining the pan in a predetermined rotational position after each dumping operation in preparation for the next fill. Depending upon the accuracy or weight tolerances within which the receptacle must be filled in each operation, a discharge funnel stationed beneath the weigh pan is selectively tiltable in a direction to control the movement of material from the weigh pan either into a fill station or reject station.

Preferably, in the weighing and filling of material, the weigh pan is provided with mutually opposed receptacles and permanent magnets positioned on opposite sides of a central axis extending horizontally through the weigh pan. Armatures are positioned in a frame in vertically offset relation to one another so as to exert an unbalanced electromagnetic force on the magnet when activated or energized by the weigh sensor so as to impart rotation to the weigh pan over a time interval sufficient to rotate the pan through 180°. A detent is disposed between the stationary frame and pan, the detent defining the retention means for locking the pan after rotation through 180° in preparation for the next fill operation. The polarity of the armatures or electromagnets with respect to the permanent magnets is such that when activated at the end of each fill the permanent magnets are repulsed by the electromagnets to cause the dump pan to shift laterally away from the holding action of the detent and to be rotated by the unbalanced forces of the electromagnets; and after rotating through at least 90°, the polarity is effectively reversed between the magnets and electromagnets so that the pan is then attracted by the electromagnets to cause it to return into locking engagement with the detent at the completion of a 180° interval.

The above and other objects, advantages and features of the present invention will become more readily appreciated and understood from a consideration of the following detailed description of a preferred embodiment of the present invention when taken together with the accompanying drawings of a preferred embodiment of the present invention, in which:

BRIEF DESCRIPTION OF THE DRAWINGS

FIG. 1 is a front view partially in section of a preferred form of precision weighing and filling apparatus in accordance with the present invention;

FIG. 2 is a side view partially in section of the preferred form of weighing and filling apparatus shown in FIG. 1;

FIG. 3 is an enlarged cross-sectional view of the weigh pan shown in FIG. 1;

FIG. 3A is an enlarged fragmentary view of the detent shown in FIG. 3;

FIG. 4 is an enlarged view in section taken about lines 4—4 of FIG. 3;

FIG. 5 is a enlarged cross-sectional view taken about lines 5—5 of FIG. 3;

FIG. 6 is an enlarged cross-sectional view taken about lines 6—6 of FIG. 3;

FIG. 7 is an enlarged view in detail of the discharge funnel;

FIG. 8 is a top plan view of the funnel shown in FIG. 7;

FIG. 9 is a side view of the funnel shown in FIG. 8;

FIG. 10 is a cross-sectional view taken about lines 10—10 of FIG. 8; and

FIG. 11 is a somewhat diagrammatic view of the control circuit for the preferred form of invention.

DETAILED DESCRIPTION OF THE PREFERRED EMBODIMENT

Referring in more detail to the drawings, there is illustrated in FIGS. 1 to 6 a preferred form of weigh system in which a weigh or dump pan 10 is suspended from a conventional form of weigh sensor 12 to receive material from a feeder represented at 14, the latter receiving comminuted material from a supply source, not shown, which delivers the material through a feed hopper 16 into the feeder assembly 14 for delivery in a substantially continuous stream onto the weigh pan assembly 10. Broadly, the weigh pan system 10 is so disposed as to receive the material from the feed assembly 14 and to be selectively rotated or tilted when a predetermined amount of material is deposited onto the weigh pan to discharge the material into a discharge funnel 18 which in turn delivers the material either into a reject funnel as represented at 19 or a fill funnel 20. In the preferred form as disclosed, a pair of weigh pan systems 10 are shown in suspended relation from a pair of weigh sensors 12 within a common housing 13, and there being a corresponding feeder trough 15 for each of the weigh pan systems 10 as well as a discharge funnel 18 leading into independent fill or reject funnels 19, and 20, respectively. It will be appreciated, however, that one or more assemblies may be employed and arranged in side-by-side relation and controlled by common circuitry in the weighing, dumping and filling of materials into containers, vials or other receptacles R. Accordingly, a description of one of the systems as described will suffice for both of the weigh/dump systems as shown and wherein like parts are correspondingly enumerated.

An important feature of the present invention resides in the construction and operation of the weigh pan system 10 so as to prevent inaccuracies in weighing of incremental amounts of material, and the dumping of same in an automated, rapid succession of steps. To this end, and as illustrated in more detail in FIGS. 3 to 6, the weigh pan system 10 comprises a weigh/dump pan 22 mounted for rotation about a centrally located shaft 23, and a pair of magnets 24 and 25 are enclosed within the pan 22 on diametrically opposed sides of the shaft 23, the magnets having their polarities reversed with respect to one another for a purpose to be hereinafter described. In the design and construction of the pan 22, it is important that its rotational inertia be held to an absolute minimum so that it can not only accelerate and decelerate rapidly, but cause a minimum of disturbance to the weighing system. For this purpose, the pan 22 is preferably composed of extremely thin-walled material defining mutually opposed receptacles 26 and 27 of generally concave or trough-like configuration interconnected by convex side panels 28 which extend the length of the pan. Opposite end walls 29 and 30 are of generally rectangular configuration and serve to enclose opposite ends of the receptacles 26 and 27, and the magnets 24 and 25 are permanently affixed to an inner surface of the end wall 29 in uniformly spaced parallel relation to the central axis or shaft 23. The pan 22 is journaled for rotation on the shaft 23 with one end of the shaft disposed within a drive solenoid 31 having a pair of armature plates 33 and 34 on opposite sides of a support block 32. The armature plates 33 and 34 are inserted into one lower free end 35 of a yoke 36 which depends downwardly from the weigh sensor 12. An armature coil 38 is wound about a bobbin 39 with the armature plates 33 and 34 flanking opposite ends of the coil 38 and being retained in assembled relation to the coil by oppositely directed screw fasteners 39'.

As best seen from FIG. 3, the end of the shaft 23 opposite to that mounted within the armature assembly is loosely inserted into a counterbore 40 of an externally threaded stem 41, the stem 41 being adjustably mounted within an outer concentric sleeve 42 which is affixed to the other free end 35' of the yoke 36. Threaded adjustment of the stem 41 is regulated by lock nuts 43 and 44 at opposite ends of the stem which bear against opposite ends of the sleeve 42.

It will be noted from a consideration of FIGS. 3 and 6 that the armature plates 33 and 34 have angularly directed end faces or corners 33' and 34', respectively, which are vertically offset with respect to one another; or in other words, are vertically offset or unsymmetrical with respect to the shaft 23 so that when energized by the solenoid 31 will apply an unbalanced electromagnetic force to the permanent magnets 24 and 25. Broadly by selectively controlling the polarity of the armature plates and their end faces 33' and 34', which are in confronting relation to the magnets 24 and 25, a rotational force is applied to the weigh pan 22 causing it to rotate or turn about the central shaft 23. Otherwise if the drive solenoid 31 had its armature end faces symmetrical with respect to the axis of rotation of the pan 22 and magnets 24 and 25, the pan would tend to be locked against rotation when electromagnetic forces were applied to the armature plates.

In order to control the limits of rotation of the pan 22 each time that the solenoid is energized, a detent post 46 projects forwardly from the lower end face of the support block 32 and beyond the end wall 29 of the weigh pan for insertion into one of a pair of radially extending grooves or depressions 48 in the end wall 29, as shown in FIGS. 3 and 3A. Normally, in the static state, the permanent magnets 24 and 25 in the weigh pan will attract the armature plates 33 and 34 so that the detent post 46 will remain firmly seated within one of the grooves 48 and retain the pan 22 firmly against rotation. When power is applied to the solenoid and the polarity of the armature plates 33 and 34 is such as to repel the permanent magnets 24 and 25, the shaft 23 and attached pan 22 are axially shifted away from engagement with the detent 46 and are free to rotate under the unbalanced forces applied by the armature plates. After the pan has rotated through an angle greater than 90°, the permanent magnets 24 and 25 will, in approaching opposite end faces 33' and 34' of the armatures 33 and 34, be attracted to the plates so as to shift the pan 22 inwardly or against the detent post 46 until the detent post 46 is once again aligned with one of the grooves 48 to lock the pan against any further rotation. Thus, notwithstanding that power is applied to the solenoid through substantially the entire period or half-cycle of rotation of the pan through 180°, the end wall 29 of the pan will in moving against the detent post 46 be gradually decelerated in approaching the end of its half-revolution. In the time interval required to rotate through 180°, the solenoid is necessarily powered but a small percentage of the time and permits use of a relatively small solenoid operating at a high power level without overheating the armature coil.

The utilization of the weigh pan system 10 in cooperation with the weigh sensor 12, material feed 14 and supply hopper 16 is given more for the purpose of illustrating an automated sequence of operations for successively filling the weigh pan with a comminuted material and successively dumping each measured amount through the discharge funnel 18 and into one of the funnels 19 and 20. For instance, the weigh sensor system 12 may be one of a number of commercial available systems, such as, a 50 gram sensor Model 202-001, manufactured and sold by Scientech, Inc. of Boulder, Colo. mounted on a seismic block 50 which has opposite ends suspended by vibration isolators 52 to opposite sidewalls of housing 13 of the sensor system 12. A plunger element 54 projects downwardly from the lower end of the sensor in spaced relation through an opening in the bottom panel 55 for each sensor and is bolted or otherwise fastened to the upper end of a yoke 36. Briefly, the internal sensing system contains the necessary elements to sense the weight of material deposited on the weigh pan and, when a particular or predetermined weight limit is reached will direct an electrical signal into a microprocessor unit represented at M for selective activation of the drive solenoid 31, as shown in FIG. 11. The unit M is designed to be capable of reversing the polarity of the armature plates 24 and 25 to impart rotation to the pan 22 through each half-cycle of revolution as described by directing positive and negative control signals through electronic switches $S_1$ and $S_2$ into the solenoid drive coil 38. For instance, the switches may be standard transistors, such as, a TIP 120 for $S_1$ and a TIP 32 for $S_2$.

A common supply hopper 16 is provided as a source of granular or powdered material which is directed through each of a plurality of discharge tubes 17, each tube supplying material to a shallow trough 15 mounted on the upper surface of each vibratory feeder 14. The vibratory feeder per se may be of conventional construction, such as a Model FTOC Vibratory Feeder manufactured and sold by Food Machinery Corporation of Homer City, Pa. The vibratory feeder generally consists of a reciprocal plunger 57 which oscillates a yieldable or spring-like support assembly generally represented at 58 to cause the material deposited in the trough to be advanced horizontally therealong and toward its discharge end 59, the latter being aligned vertically over the weigh pan system 10. An adjustable gate 60 is mounted at the enlarged open end of the trough 56 by means of a suitable clamp bar 61 so as to regulate the level of material advanced along the trough toward the discharge end 59.

As each receptacle in the pan 22 is filled to a predetermined weight limit, a control signal activates the drive solenoid 31 and causes the pan to undergo rotation through 180° so as to discharge its contents into the funnel 18.

Each funnel 18 with its lower convergent open end is normally aligned directly over a reject funnel 19. The discharge funnel 18 is suspended in position, as best seen from FIGS. 7 to 10, by a pair of spaced parallel straps 64 which are clamped against diametrically opposed sides of each funnel 18 by spacers 65 and 66 extending between opposite ends of the straps 64. One of the straps is secured to a control shaft 62 journaled at opposite ends on standards or posts 67. A solenoid 68 directly beneath the shaft 62 has a plunger element 68' movable into engagement with a tilt plate 69, the latter depending downwardly from the shaft 62 and operative in response to engagement by the solenoid plunger to tilt the discharge funnel 18 about the axis of the shaft from a position aligned with a reject funnel 19 to a dotted line position, as illustrated in FIG. 10, in which the discharge funnel is aligned with a fill funnel 20. In this manner, the discharge funnel 18 is operative in combination with the weigh sensor 12 to selectively reject any quantities discharged by the weigh pan which are not within the weight limits established. Thus, if the weigh sensor senses a weight in the pan 22 outside of the tolerances established, the discharge funnel 18 will be left in its normally aligned position with the reject funnel 19. Any material collected in the reject funnel 19 then may be recycled to the material supply source or hopper 16 through a reject tube as represented at 56. However, if the weight sensed by the weigh sensor falls within the limits established, the control signal from the weigh sensor will be gated simultaneously through the drive solenoid 31 and to the tilt solenoid 68 causing the discharge funnel 18 to tilt simultaneously with rotation of the pan 22 so as to discharge the contents of the pan into the fill funnel 20. Once the tilt solenoid 68 is de-energized, the discharge funnel 18 is returned to its normally aligned position by the increased weight of the spacer 66 relative to that of the spacer 65 so as to cause the funnel 18 to return to its original disposition with the tilt plate bearing against the end of the plunger.

Operation of the system and method may be perceived by reference to the diagrammatic showing in FIG. 11 of the control circuit in which the microprocessor M receives certain input signals from a keyboard control 82 for the purpose of initiating the weigh/dump operation. Again, while a pair of dump pans 22 are illustrated for use in cooperation with a corresponding pair of weigh sensors 12 and discharge funnels 18, the microprocessor may be programmed to control the weight sensing, dumping and filling of any desired number of receptacles as represented at R which are advanced along a suitable conveyor system represented at 84. Accordingly, the keyboard control 82 is designed to encode into the microprocessor the necessary information with respect to the number of containers to be filled simultaneously, and accordingly the number of weigh/dump pans to be activated as well as the weight limits and number of repetitions. Some or all of this information may be suitably displayed as represented at 83. Basically, the microprocessor may be activated in response to signals received from container position detector 85 to indicate that a receptacle R is in position to receive material from the discharge funnel as well as a signal from the weigh sensors 12 to indicate that an empty weigh dump pan 22 is in position to receive material. Under these conditions, the microprocessor M will direct a control signal to the vibratory feeder causing it to advance material onto the dump pan 22. When the pan or pans 22 are filled a signal is applied to the sensor 12 to the microprocessor M instructing it to compare with the predetermined weight established. If the signal received from the weigh sensor 12 is such as to indicate that the actual weight of the material on the dump pan is outside of the tolerances established, even though the dump pan solenoid is energized as described by a control signal to the coil 38 causing the pan 22 to dump the material into the discharge funnel 18, the discharge funnel will be left in the reject position to permit the material to pass through the discharge funnel 19 and into the reject chute 56 for recycling. If, however, the weight of the material on the dump pan is within the tolerances established, a control signal is directed over line 87 from the microprocessor to solenoid 68 to tilt the funnel to the fill position and direct the material dumped by the pan into one of the fill funnels 20. After a predetermined time interval, the signal applied over line 87 to the tilt solenoid 68 is removed, and the weight of the spacer 66 is sufficient to return the discharge funnel 18 to its normally disposed reject position. Depending upon the amount of material deposited and dumped in each half-cycle of operation, the entire weighing, dumping and filling sequence may require in the range of three to six seconds while the period of energization for the drive solenoid 38 for the dump pan 22 as well as the funnel drive solenoid 68 is substantially less than a second interval.

Apart from the specific form of apparatus described for carrying out the weighing, dumping and fill/reject operation, another feature of the invention resides in the particular sequence established in which each dump pan is filled and dumped into the discharge funnel irrespective of whether the weight of the material in the pan is outside the weight limit established. Thereafter, the direction of material from the funnel either into a fill or reject section offers substantial advantages particularly in the handling of small quantities of comminuted material where it is extremely important that close tolerances be met in the filling of vials or containers with a predetermined weight of material. This is of particular application as hereinbefore mentioned in measuring out limited quantities of prescription drugs which must meet exacting tolerances in order to be certain that the correct dosage is administered to a patient. Similarly, it is important that excess materials discharged through the reject funnel 19 be capable of recovery and reuse. Particularly in the handling of comminuted or pulverized material, however, while the weigh sensor may closely regulate the amount of material advanced by the vibratory feeder 15 onto the dump pan 10, there will be cases in which the weigh sensor will either undershoot or overshoot the predetermined amount to be deposited by the feeder onto the pan. In other words, while the weigh sensor will in accordance with the rate of filling operate to direct a control signal back to the microprocessor even as the maximum weight limit is approached, in the brief time interval required for the microprocessor to deactivate the feeder and interrupt the feed sequence either more or less material than anticipated may be deposited onto the pan. The weigh sensor will sense the actual weight deposited and direct a signal to the microprocessor M even as the pan 22 is activated by the drive solenoid 38 to dump the material into the discharge funnel 18 so that sufficient time is afforded either to fill or reject the material dumped without interrupting the operation of the dump pan.

It is therefore to be understood that various modifications and changes in the construction and arrangement of parts and sequence of steps employed in the preferred form of invention may be made without departing from the spirit and scope of the present invention as defined by the appended claims.

I claim:

1. In a precision weighing system for weighing out in rapid succession predetermined amounts of a comminuted material in which a source of material supply includes means for feeding and discharging the material under the control of a weigh sensor which is operative to sense the weight of material discharged from said material source into a receptacle, the improvement comprising:
 a weigh pan including a receptacle portion disposed to receive material from said material source, and rotating means associated with said weigh pan;
 activating means responsive to a signal generated by said weigh sensor when a predetermined amount of material is discharged into said receptacle to energize said rotating means over a predetermined time interval whereby said rotating means is operative to impart a rotational force to said weigh pan thereby causing said weigh pan to dump the contents of material discharged into said receptacle;
 means for retaining said weigh pan in a predetermined rotational position after dumping the contents from said receptacle; and
 a discharge funnel disposed beneath said weigh pan to receive the contents of material dumped by said weigh pan, a fill funnel and reject funnel in juxtaposed relation to one another beneath each discharge funnel, and tilting control means operative to selectively tilt said discharge funnel into alignment with one of said fill and reject funnels in response to the weight of material discharged from said material source into said weigh pan.

2. In a system according to claim 1, including a discharge funnel, said weigh pan being operative to dump the contents of the material by gravity into said funnel when said weigh pan is rotated by said rotating means.

3. In a system according to claim 1, said rotating means being operative to rotate said weigh pan through 180°, said weigh pan provided with diametrically opposed receptacles of generally concave configuration defining a common enclosure therebetween.

4. In a system according to claim 3, said weigh pan provided with diametrically opposed receptacles whereupon rotation of said weigh pan through 180° to dump the contents in one receptacle the opposed receptacle is brought into position to be filled by said material source.

5. In a system according to claim 1, said weigh pan provided with a plurality of receptacles disposed in equally spaced circumferential relation about a common axis, and said activating means operative to rotate said weigh pan through an angle corresponding to the spacing between adjacent receptacles.

6. In a system according to claim 5, said retention means operative to momentarily lock said weigh pan in position after rotation through a predetermined angle to present each receptacle in succession for filling by said material source.

7. In a system according to claim 1, said rotating means defined by magnetic members on said weigh pan and electromagnet means vertically offset on opposite sides of a horizontal plane through said weigh pan whereby to impart an unbalanced magnetic force causing rotation of said weigh pan in response to said energizing signal from said activating means.

8. In a system according to claim 7, said electromagnetic means being activated to initiate rotation of said weigh pan over a time interval required for advancement of said weigh pan into each angular position, the polarity of said electromagnetic members being successively reversed each time that said weigh pan is rotated.

9. In a weighing apparatus for weighing out in rapid succession equal amounts of a comminuted material in which a source of material supply includes means for feeding and discharging the material under the control of a weigh sensor which is operative to sense the weight of material discharged from said material source into a receptacle, the improvement comprising:
   a weigh pan mounted for rotation about a horizontal axis including a receptacle portion disposed to receive material from said material source, and at least one magnetic member mounted in offset relation to the horizontal axis of said weigh pan;
   activating means responsive to a signal generated by said weigh sensor when a predetermined amount of material is discharged into said receptacle to apply an energizing signal to said magnetic member whereby to generate unbalanced magnetic forces causing said weigh pan to rotate and dump the contents of material discharged into said receptacle;
and
   means for retaining said weigh pan in a predetermined rotational position after dumping the material from said receptacle.

10. In a system according to claim 9, said activating means defined by a solenoid having armature plates offset on opposite sides of a plane through said magnetic member on said weigh pan whereby to impart an unbalanced magnetic force causing rotation of said weigh pan when said solenoid is activated.

11. In a system according to claim 9, including a tiltable funnel member to receive the material dumped by said weigh pan.

12. In a system according to claim 10, including a fill funnel and reject funnel in juxtaposed relation beneath said tiltable funnel member, and tilting control means operative to selectively tilt said tiltable funnel member into alignment with one of said fill and reject funnels.

13. In a system according to claim 9, said activating means being operative to rotate said weigh pan through 180°, and said weigh pan having diametrically opposed trough-like receptacles successively brought into position to be filled by said material source when said weigh pan is rotated.

14. In a system according to claim 12, said retention means defined by a detent operative to lock said weigh pan in position after each rotation to present each receptacle in succession for filling by said material source.

15. In a weighing apparatus, a dump pan mounted for rotation about a central axis including a pair of permanent magnets of reversed polarity disposed in spaced parallel relation to said control axis, support means at opposite ends of said dump pan supporting said dump pan for rotation including a solenoid at one end of said dump pan having means operative when energized to apply an unbalanced magnetic force to said permanent magnets whereby to rotate said dump pan about its central axis.

16. In a weighing apparatus according to claim 15, said support means operative to shift said dump pan toward and away from said solenoid.

17. In a weighing apparatus according to claim 16, including detent means between said support means and said dump pan operative to limit the rotation of said dump pan through a predetermined angle.

18. In a weighing apparatus according to claim 17, said solenoid including energizing means operative to cause said armature plates to repel said permanent magnets on said weigh pan when energized and to attract said permanent magnets on said weigh pan when de-energized.

19. In a weighing apparatus according to claim 18, said dump pan provided with diametrically opposed receptacles of generally concave configuration defining a common enclosure therebetween for disposition of said permanent magnets in spaced parallel relation to one another.

20. A method of successively weighing equal amounts of a comminuted material and advancing each amount weighed selectively to a fill funnel or reject funnel comprising the steps of:
   providing a material supply source;
   feeding the material from said material supply source into a receptacle;
   sensing the weight of material delivered into said receptacle and interrupting the supply of material to said receptacle when a predetermined weight limit is sensed;
   applying an unbalancing magnetic force to said receptacle whereby to tip said receptacle to dump the material contained in said receptacle;
   advancing the material dumped through a discharge chute normally aligned with one of said fill funnels and reject funnels; and
   altering the direction of advancement of the material through said discharge chute to deliver said material into one of said fill funnels and reject funnels in accordance with the weight of material sensed.

21. The method according to claim 20, further characterized in that said discharge funnel is normally aligned with said reject funnel and altering the direction of flow of material through said discharge chute into said fill funnel when the weight of material sensed is within a predetermined weight limit.

22. The method according to claim 20, further characterized in providing a pair of weigh receptacles in mutually opposed relation to one another and reversibly rotating said receptacles through 180° to tip each receptacle as it is filled and dump the contents of the receptacle into said discharge chute.

23. The method according to claim 20, further characterized in feeding said material from said material supply source by gravity into said receptacle and tilting said receptacle to dump the contents thereof by gravity into said discharge chute.

* * * * *